United States Patent
Nakamura (10) Patent No.: US 8,065,910 B2
(45) Date of Patent: Nov. 29, 2011

(54) ABNORMALITY DETERMINATION APPARATUS AND METHOD FOR OXYGEN SENSOR

(75) Inventor: Takashi Nakamura, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 128 days.

(21) Appl. No.: 12/694,397

(22) Filed: Jan. 27, 2010

(65) Prior Publication Data

US 2010/0212416 A1    Aug. 26, 2010

(30) Foreign Application Priority Data

Feb. 23, 2009   (JP) ................................. 2009-039211

(51) Int. Cl.
    *G01M 15/10* (2006.01)
(52) U.S. Cl. .................................. 73/114.75; 73/114.73
(58) Field of Classification Search ................ 73/114.73, 73/114.75
    See application file for complete search history.

(56) References Cited

U.S. PATENT DOCUMENTS

| 5,927,260 | A  | * | 7/1999  | Kishimoto et al. | ........... 123/688 |
| 7,444,235 | B2 | * | 10/2008 | Anilovich et al. | ........... 701/114 |
| 7,574,905 | B2 | * | 8/2009  | Toya             | ........... 73/114.73 |
| 7,769,534 | B1 | * | 8/2010  | Xu et al.        | ........... 701/109 |

FOREIGN PATENT DOCUMENTS

| JP | 09170966   | 6/1997  |
| JP | 2003343339 | 12/2003 |
| JP | 2008169776 | 7/2008  |

* cited by examiner

*Primary Examiner* — Freddie Kirkland, III (74) *Attorney, Agent, or Firm* — Gifford, Krass, Sprinkle, Anderson & Citkowski, P.C.

(57) ABSTRACT

An abnormality determination apparatus for an oxygen sensor provided on the downstream side of a catalyst includes: a first determination portion that determines whether amount of decline in output value of the oxygen sensor during a period from when amount of intake air or exhaust gas declines before a fuel cut is started to when the fuel cut is started is smaller than a reference amount of decline; a second determination portion that determines whether degree of change in the output value when the output value changes from a first reference value to a second reference value that shows a leaner state than the first reference value is more gradual than a set degree of change after the fuel cut is started; and a third determination portion that determines whether the oxygen sensor is abnormal based on determinations by the first determination portion the second determination portion.

9 Claims, 5 Drawing Sheets

ABNORMALITY DETERMINATION APPARATUS AND METHOD FOR OXYGEN SENSOR

INCORPORATION BY REFERENCE

The disclosure of Japanese Patent Application No. 2009-039211 filed on Feb. 23, 2009 including the specification, drawings and abstract is incorporated herein by reference in its entirety.

BACKGROUND OF THE INVENTION

1. Field of the Invention

The invention relates to an abnormality determination apparatus for an oxygen sensor which determines the presence/absence of an abnormality of an oxygen sensor that is provided downstream of a catalytic converter of an internal combustion engine, and also to an abnormality determination method for the oxygen sensor.

2. Description of the Related Art

In internal combustion engines, removal of exhaust gas components has been carried out through the use of catalysts for use for exhaust gas purification which are provided in an exhaust passageway. The removal of exhaust gas components by catalysts is efficiently performed if the air/fuel ratio of the mixture burned in the internal combustion engine is within a predetermined range. Therefore, it is a common practice to provide an oxygen sensor that detects the oxygen concentration in exhaust gas at an upstream side of a catalyst, and perform an air/fuel ratio feedback control of detecting the air/fuel ratio of mixture on the basis of an output signal of the oxygen sensor, and finding an air/fuel ratio correction value for the amount of fuel injection such that the detected air/fuel ratio becomes equal to a target air/fuel ratio, and correcting the amount of fuel injection to the increased or decreased side through the use of the air/fuel ratio correction value.

Furthermore, in order to grasp the state of removal of exhaust gas components by a catalyst, it is also a common practice to provide an oxygen sensor at the downstream side of the catalyst, and perform a so-called subsidiary feedback control of air/fuel ratio in which the air/fuel ratio of the exhaust gas having passed through the catalyst is detected on the basis of the output value of the oxygen sensor, and an amendment value for the air/fuel ratio correction value is calculated according to the detected air/fuel ratio.

In the foregoing subsidiary feedback control, since the output value of the oxygen sensor at the downstream side of the catalyst is utilized, occurrence of abnormality in the oxygen sensor will give rise to a risk of failing to perform normal control and, in turn, failing to sufficiently purify exhaust gas.

Therefore, it has been proposed to adopt an apparatus that executes a fuel cut of stopping the fuel injection from fuel injection valves, and then determines the presence/absence of an abnormality of the oxygen sensor on the basis of the degree of change in the output value of the oxygen sensor at the downstream side of the catalyst after the output value begins to change to a value that shows a leaner state at the time of introduction of fresh air into the exhaust passageway (e.g., see Japanese Patent Application Publication No. 9-170966 (JP-A-9-170966), Japanese Patent Application Publication No. 2003-343339 (JP-A-2003-343339), and Japanese Patent Application Publication No. 2008-169776 (JP-A-2008-169776)).

For example, the apparatuses disclosed in JP-A-9-170966 and JP-A-2008-169776 measure as a response time the amount of time that is taken for the output value of the oxygen sensor at the downstream side of the catalyst to change from a first threshold value to a second threshold value that shows a leaner state than the first threshold value after the fuel cut is executed. Then, if this response time is longer than a reference response time that is set beforehand, it is determined that the oxygen sensor at the downstream side of the catalyst is abnormal.

By the way, even when the oxygen sensor at the downstream side of the catalyst is not abnormal, it sometimes happens that the output value of the oxygen sensor gradually changes to a value that shows the leaner state, during the period after the fuel cut is executed but before fresh air reaches the oxygen sensor at the downstream side of the catalyst (hereinafter, this phenomenon will be referred to also as "pre-fresh-air-arrival output decline phenomenon"). If despite occurrence of this phenomenon, the abnormality determination regarding the oxygen sensor is performed on the basis of the response time, there is possibility of making a false determination that the oxygen sensor is abnormal when the oxygen sensor is actually normal.

In order to reduce such false determinations as much as possible, the apparatus disclosed in JP-A-2008-169776 determines whether or not fresh air has reached the oxygen sensor at the upstream side of the catalyst, and detects the output value produced by the catalyst-downstream-side oxygen sensor immediately after it is determined that fresh air has reached the upstream-side oxygen sensor. Then, if the detected output value is less than or equal to a criterion value that is set beforehand, the apparatus prohibits the determination that the catalyst-downstream-side oxygen sensor is abnormal.

As stated above, the apparatus disclosed in JP-A-2008-169776 determines whether or not the foregoing pre-fresh-air-arrival output decline phenomenon has occurred on the basis of the output value of the catalyst-downstream-side oxygen sensor that is produced immediately after the arrival of fresh air at the catalyst-upstream-side oxygen sensor. However the accuracy of this determination cannot be said to be sufficiently high, and therefore has been desired to be further improved.

SUMMARY OF THE INVENTION

The invention provides an abnormality determination apparatus for an oxygen sensor provided on the downstream side of a catalyst which restrains a false determination that is caused by a phenomenon in which the output value of the oxygen sensor gradually changes to a value that shows a leaner state after the fuel cut is started but before fresh air reaches the oxygen sensor at the downstream side of the catalyst, and which improves the accuracy of the determination as to the presence/absence of the occurrence of the phenomenon so as to allow more efficient abnormality determination regarding the oxygen sensor, and an abnormality determination method for an oxygen sensor.

An oxygen sensor abnormality determination apparatus in accordance with a first aspect of the invention includes: a catalyst provided in an exhaust passageway of an internal combustion engine; an oxygen sensor provided in the exhaust passageway on a downstream side of the catalyst; an output decline acquisition portion that acquires amount of decline in output value of the oxygen sensor during a period from when amount of intake air declines or when amount of exhaust gas declines before a fuel cut is started to when the fuel cut is started; a first determination portion that determines whether or not the amount of decline acquired by the output decline acquisition portion is smaller than a reference amount of decline that is set beforehand; a second determination portion that determines whether or not, after the fuel cut is started, degree of change in the output value of the oxygen sensor when the output value of the oxygen sensor changes from a first reference value to a second reference value that shows a leaner state than the first reference value is more gradual than a set degree of change that is set beforehand; and a third determination portion that determines whether or not the oxygen sensor is abnormal based on a result of determination by the first determination portion and a result of determination by the second determination portion.

In the first aspect of the invention, the third determination portion may determine that the oxygen sensor is abnormal if it is determined by the first determination portion that the amount of decline is smaller than the reference amount of decline and it is determined by the second determination portion that the degree of change is more gradual than the set degree of change.

According to the oxygen sensor abnormality determination apparatus having the foregoing construction, it is determined whether or not the oxygen sensor is abnormal on the basis of a result of the determination as to whether or not the amount of decline in output value of the oxygen sensor during the period from when the amount of intake air declines or when the amount of exhaust gas declines before a fuel cut is started to when the fuel cut is started is smaller than the reference amount of decline that is set beforehand, and a result of the determination as to whether or not, after the fuel cut is started, the degree of change in the output value of the oxygen sensor when the output value of the oxygen sensor changes from a first reference value to a second reference value that shows a leaner state than the first reference value is more gradual than the set degree of change that is set beforehand. The amount of decline in the output value of the oxygen sensor serves as a parameter that accurately shows how much the catalyst is filled with rich-gas components. Therefore, by setting an appropriate value as the reference amount of decline, it becomes possible to improve the accuracy of the determination as to whether or not there occurs the phenomenon in which the output value of the oxygen sensor gradually changes to a value that shows a leaner state after the fuel cut is started but before fresh air reaches the oxygen sensor at the downstream side of the catalyst.

Besides, in the first aspect of the invention, when the amount of intake air declines or when the amount of exhaust gas declines before the fuel cut is started may be when the internal combustion engine shifts from an idle-off state to an idle-on state.

Besides, in the first aspect of the invention, the second determination portion may determine whether or not, after the fuel cut is started, a response time that is taken for the output value of the oxygen sensor to change from the first reference value to the second reference value is longer than a reference response time that is set beforehand.

Besides, in the first aspect of the invention, the third determination portion may avoid determining that the oxygen sensor is abnormal, but may determine again whether or not the oxygen sensor is abnormal after a next time the fuel cut is started, if it is determined by the first determination portion that the amount of decline is not smaller than the reference amount of decline and it is determined by the second determination portion that the degree of change is more gradual than the set degree of change.

The oxygen sensor abnormality determination apparatus having the foregoing construction, while achieving the foregoing effects, is able to restrain false determination caused by the phenomenon in which the output value of the oxygen sensor gradually changes to a value that shows the leaner state after the fuel cut starts but before fresh air reaches the oxygen sensor at the downstream side of the catalyst.

Besides, in the first aspect of the invention, the third determination portion may determine that the oxygen sensor is abnormal, if a determination that the amount of decline is not smaller than the reference amount of decline and a determination that the degree of change is more gradual than the set degree of change are made consecutively a pre-set number of times by the first determination portion and the second determination portion, respectively.

If the oxygen sensor is normal, it is rare that the determination made by the first determination portion that the amount of decline is not smaller than the reference amount of decline and the determination made by the second determination means that the degree of change is more gradual than the set degree of change are made consecutively many times. Therefore, in the foregoing construction, determination of abnormality of the oxygen sensor can be made early, so that the burden on the control apparatus can be lessened.

Besides, in the first aspect of the invention, the third determination portion may determine that the oxygen sensor is normal if it is determined by the second determination portion that the degree of change is not more gradual than the set degree of change.

A second aspect of the invention is an abnormality determination method for an oxygen sensor provided in a portion of an exhaust passageway of an internal combustion engine which is on a downstream side of a catalyst that is provided in the exhaust passageway, the method including: acquiring amount of decline in output value of the oxygen sensor during a period from when amount of intake air declines or when amount of exhaust gas declines before a fuel cut is started to when the fuel cut is started; performing a first determination in which it is determined whether or not the amount of decline is smaller than a reference amount of decline that is set beforehand; performing a second determination in which it is determined whether or not, after the fuel cut is started, degree of change in the output value of the oxygen sensor when the output value of the oxygen sensor changes from a first reference value to a second reference value that shows a leaner state than the first reference value is more gradual than a set degree of change that is set beforehand; and determining whether or not the oxygen sensor is abnormal based on a result of the first determination and a result of the second determination.

According to the oxygen sensor abnormality determination apparatus and method of the first and second aspects of the invention, it becomes possible to restrain a false determination caused by a phenomenon in which the output value of the oxygen sensor gradually changes to a value that shows the leaner state after the fuel cut is started but before fresh air reaches the oxygen sensor at the downstream side of the catalyst, and to improve the accuracy of the determination as to the presence/absence of the occurrence of the phenomenon so as to allow more efficient process of abnormality determination regarding the oxygen sensor.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
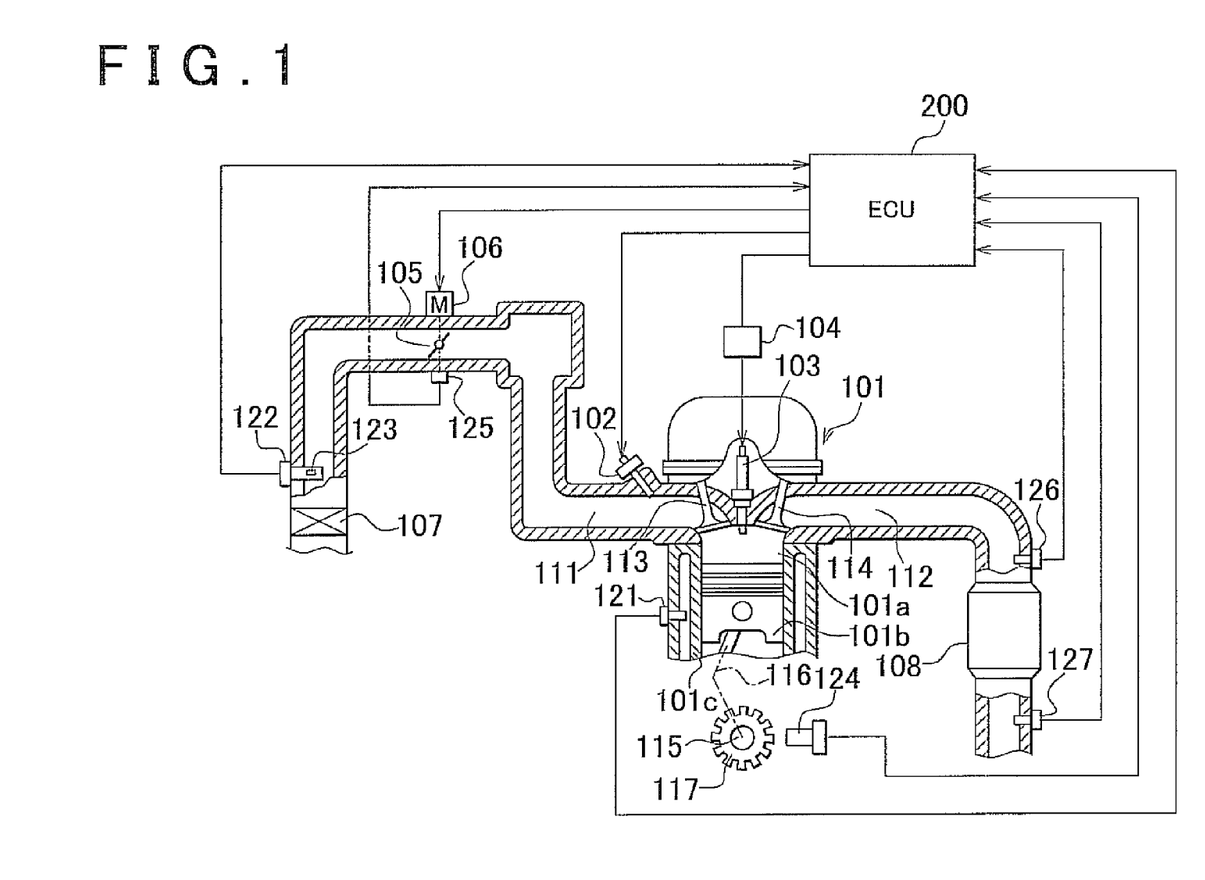
FIG. 1 is a schematic diagram showing an engine of a vehicle equipped with an abnormality determination apparatus for an oxygen sensor in accordance with an embodiment of the invention and surroundings of the engine.

Hereinafter, embodiments of the invention will be described with reference to the drawings. FIG. 1 shows a general construction of an engine 101 of a vehicle in which an abnormality determination apparatus for an oxygen sensor in accordance with an embodiment of the invention and surroundings of the engine 101. In addition, FIG. 1 shows the construction of only one of the cylinders of the engine 101.

The engine 101 is, for example, a four-cylinder gasoline engine, and includes pistons 101b each of which partially defines a combustion chamber 101a in one of the corresponding cylinders, and also includes a crankshaft 115. Each piston 101b is linked to the crankshaft 115 via a connecting rod 116. The reciprocating motion of the piston 101b is converted into rotary motion of the crankshaft 115 by the connecting rods 116.

A signal rotor 117 is attached to the crankshaft 115. A crank position sensor 124 is installed near the signal rotor 117. The crank position sensor 124 generates pulse signals while the crankshaft 115 is rotating.

A cylinder block 101c of the engine 101 is provided with a water temperature sensor 121 that detects the engine cooling water temperature. An ignition plug 103 is disposed in each combustion chamber 101a of the engine 101. The ignition timing of the ignition plugs 103 is adjusted by an igniter 104. The igniter 104 is driven by an electronic control unit (ECU) 200.

An intake passageway 111 and an exhaust passageway 112 are connected to the combustion chambers 101a of the engine 101. Intake valves 113 are provided between the intake passageway 111 and the combustion chambers 101a, and exhaust valves 114 are provided between the combustion chambers 101a and the exhaust passageway 112. The intake valves 113 and the exhaust valves 114 are driven to open and close by rotation of an intake camshaft and rotation of an exhaust camshaft, respectively, to both of which rotation of the crankshaft 115 is transmitted.

An air cleaner 107, a hot-wire type air flow meter 122, an intake air temperature sensor 123 (provided within an air flow meter 122), and an electronically controlled throttle valve 105 for adjusting the amount of intake air of the engine 101 are disposed on the intake passageway 111 of the engine 101. The throttle valve 105 is driven by a throttle motor 106. The degree of opening of the throttle valve 105 is detected by a throttle opening degree sensor 125.

Besides, injectors 102 for fuel injection are installed in the intake passageway 111. The injectors 102 are supplied with fuel at a predetermined pressure from a fuel tank by a fuel pump, and fuel is injected from the injectors 102 into the intake passageway 111. The injected fuel is mixed with intake air to form a mixture that is introduced into the combustion chamber 101a of the engine 101. The mixture introduced into the combustion chambers 101a is ignited by the ignition plugs 103 to burn and explode. Due to the burning and explosion in the combustion chambers 101a of air-fuel mixture, the pistons 101b reciprocate, rotating the crankshaft 115.

A three-way catalyst 108 that purifies exhaust gas is provided in the exhaust passageway 112 of the engine 101. The three-way catalyst 108 has a function of purifying exhaust gas by oxidizing HC and CO in exhaust gas and reducing NOx in the same exhaust gas during a state in which the combustion is carried out at or around the stoichiometric air/fuel ratio.

Furthermore, an air/fuel ratio sensor 126 that detects the oxygen concentration in exhaust gas is provided in the exhaust passageway 112 of the engine, at an upstream side of the three-way catalyst 108.

Besides, an oxygen sensor 127 that detects the oxygen concentration in exhaust gas is provided at the downstream side of the three-way catalyst 108 (and, hereinafter, will be referred to also as "downstream-side oxygen sensor 127"). The downstream-side oxygen sensor 127 responds to both rich-gas components (CO, HC, etc.) and lean-gas components (oxygen components) in exhaust gas, and outputs a voltage that is greater than or equal to a predetermined value (e.g., 0.6 V) when the air/fuel ratio is richer than the stoichiometric air/fuel ratio, and outputs a voltage less than a predetermined value (e.g., 0.2 V) when the air/fuel ratio is leaner than the stoichiometric air/fuel ratio. In this embodiment, if the output voltage of the oxygen sensor 127 is greater than or equal to "0.6 V", the air/fuel ratio is determined as being "rich". If the output voltage thereof is less than "0.2 V", the air/fuel ratio is determined as being "lean".

The ECU 200 is an electronic control unit that includes a CPU, a ROM, a RAM, a back-up RAM, etc. The ROM stores various control programs, and data that is referred to when such a control program is executed. The CPU executes computation processes on the basis of the various control programs and data stored in the ROM. The RAM is a memory for temporarily storing results of computations performed by the CPU, and data and the like input from various sensors. The back-up RAM is a non-volatile memory for storing data and the like that needs to be stored during a stop of the engine 101.

The ECU 200, as shown in FIG. 1, is connected to various sensors, including the water temperature sensor 121, the air flow meter 122, the intake air temperature sensor 123, the crank position sensor 124, the throttle opening degree sensor 125, the air/fuel ratio sensor 126, the downstream-side oxygen sensor 127, etc. Besides, the ECU 200 is also connected to the injectors 102, the igniter 104 of the ignition plugs 103, the throttle motor 106 of the throttle valve 105, etc.

The ECU 200 executes various controls of the engine 101, including a fuel injection control of the injectors 102, an ignition control of the ignition plugs 103, etc., on the basis of detection signals from various sensors mentioned above.

Besides, the ECU 20 performs an abnormality determination process of determining whether or not the downstream-side oxygen sensor 127 is abnormal.

[ABNORMALITY DETERMINATION PROCESS]

Hereinafter, the abnormality determination process of the downstream-side oxygen sensor 127 will be described in detail.

Figure 2A:
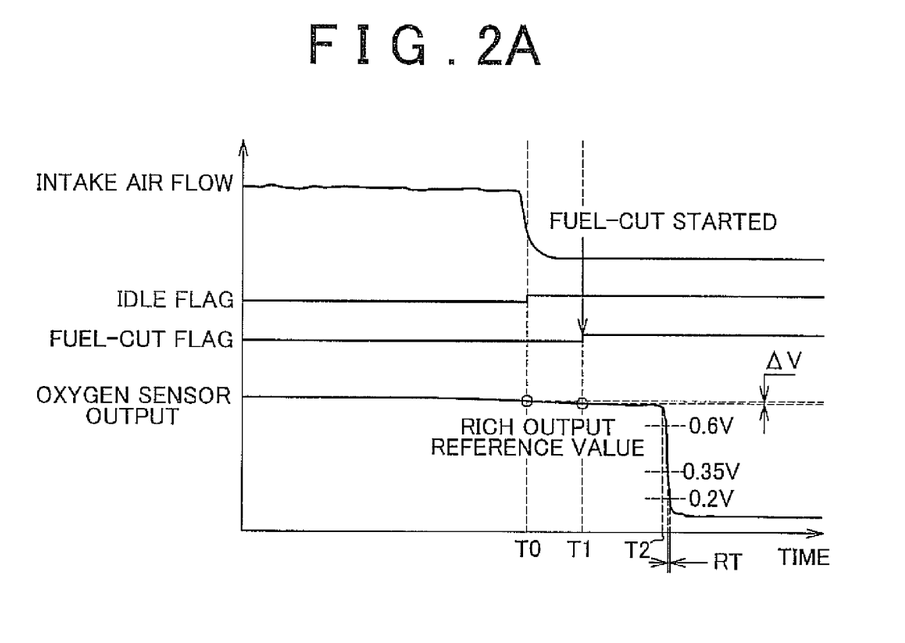
FIGS. 2A and 2B are time charts showing the amount of intake air of the engine, an idle flag, a fuel cut flag, the output value of a downstream-side oxygen sensor, etc.
Figure 2B:
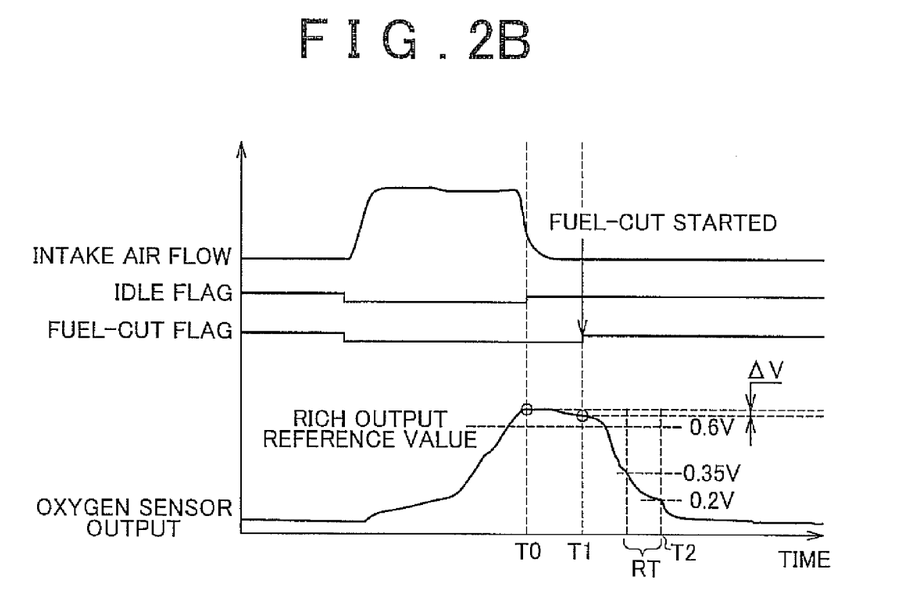

FIGS. 2A and 2B are time charts showing the amount of intake air of the engine 101 before and after execution of the fuel cut, an idle flag that shows whether or not the engine 101 is in an idle state, a fuel-cut flag that shows whether or not the engine 101 is in a fuel cut state, the output value of the downstream-side oxygen sensor 127, etc. It is to be noted herein that the output value of the downstream-side oxygen sensor 127 is the output value provided when the downstream-side oxygen sensor 127 is normal.

FIG. 2A shows an example of results of an experiment in the case where the output value of the downstream-side oxygen sensor 127 rapidly declines to a value that shows a lean state when fresh air arrives at the downstream-side oxygen sensor 127 (shown by time T2) after the fuel cut is executed. FIG. 2B shows an example of results of an experiment in the case where the above-described "pre-fresh-air-arrival output decline phenomenon" has occurred.

The inventors of the present application have found that if the amount of decline $\Delta V$ in the output value of the downstream-side oxygen sensor 127 during the period from when the intake air amount (amount of flow of intake air) declines (time T0) before the fuel cut is started to when the fuel cut is started (time T1) is smaller than a predetermined reference amount of decline (e.g., 0 V), the possibility of occurrence of the "pre-fresh-air-arrival output decline phenomenon" is low as shown in FIG. 2A, and that if the amount of decline is larger than the reference amount of decline, the possibility of occurrence of the "pre-fresh-air-arrival output decline phenomenon" becomes high as shown in FIG. 2B. In addition, in this embodiment, the time when the amount of intake air of the engine 101 declines (time T0) is the time of change from an idle-off state to an idle-on state.

A reason why occurrence of the "pre-fresh-air-arrival output decline phenomenon" can be predicted according to the amount of decline $\Delta V$ of the downstream-side oxygen sensor 127 is speculated as follows.

When the engine 101 enters the idle state, the amount of exhaust gas sharply reduces. Therefore, the output value of the downstream-side oxygen sensor 127 becomes likely to decline, but the amount of decline $\Delta V$ in the output value is small by contraries. This is considered to be because the three-way catalyst 108 is generally filled with rich-gas components (CO, XHC, etc.) prior to the arrival of fresh air. Then, if the three-way catalyst 108 is generally filled with rich-gas components, it is considered highly likely that the output value of the downstream-side oxygen sensor 127 will be maintained until fresh air arrives at the oxygen sensor 127.

On the other hand, if the amount of decline $\Delta V$ in the output value is large, it is considered that the three-way catalyst 108 is not filled very much with rich-gas components prior to the arrival of fresh air. Then, if the three-way catalyst 108 is not filled with rich-gas components, it is considered highly likely that the output value of the downstream-side oxygen sensor 127 will further decline until fresh air arrives at the oxygen sensor 127.

Figure 3:
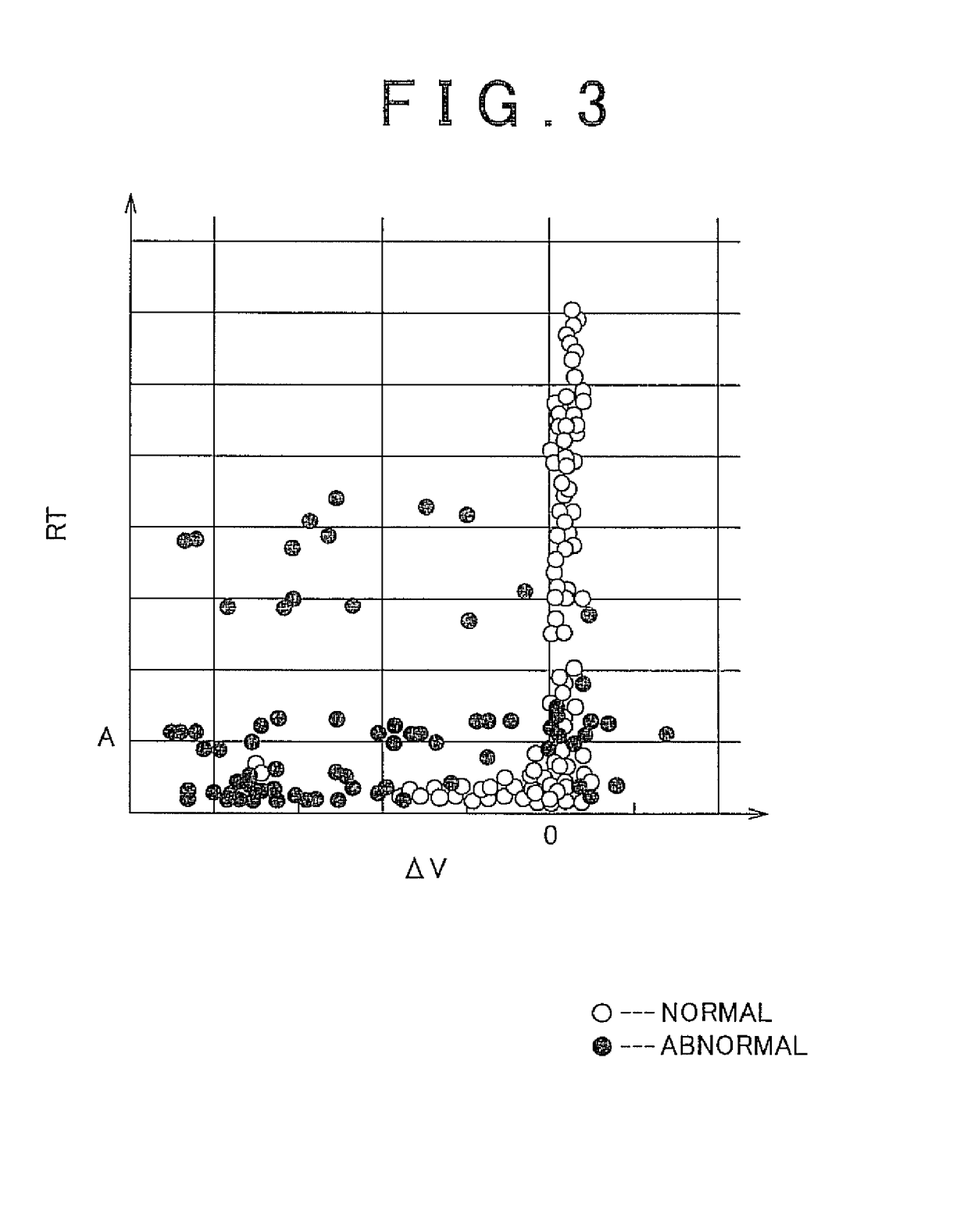
FIG. 3 is a graph showing results of experiments, showing a relation between the response time and the amount of decline in the output value of the downstream-side oxygen sensor.

Results of experiments related to the foregoing speculation are shown in FIG. 3. FIG. 3 shows a relation between the amount of decline $\Delta V$ in the output value of the downstream-side oxygen sensor 127 and the response time RT of the sensor 127. The response time RT is an amount of time that is taken for the output value of the downstream-side oxygen sensor 127 to change from a first reference value (e.g., 0.35 V in this embodiment) that is set beforehand to a second reference value (e.g., 0.2 V in this embodiment) that shows a leaner state than the first reference value.

In FIG. 3, experiment results of the downstream-side oxygen sensor 127 that is normal are shown by blank circles, and experiment results of the downstream-side oxygen sensor 127 that is abnormal are shown by solid circles. As shown in FIG. 3, in a region where $\Delta V$ is 0 or below, the response time RT of the normal downstream-side oxygen sensor 127 is less than or equal to a certain time A. On the other hand, the response time RT of the downstream-side oxygen sensor 127 that is abnormal in responsiveness tends to be longer than the certain time A.

Therefore, in this embodiment, the amount of decline $\Delta V$ in the output value of the downstream-side oxygen sensor 127 between the time (T0) of change from the idle-off state to the idle-on state, and the time (T1) of start of the fuel cut is acquired, and after the fuel cut starts, and it is determined whether or not the amount of decline $\Delta V$ acquired at a timing immediately following the start of the fuel cut is smaller than a reference amount of decline that is set beforehand (hereinafter, this determination will be referred to also as "first determination"). Then, abnormality determination regarding the downstream-side oxygen sensor 127 is performed on the basis of a result of the first determination and a result of a second determination (described below). Incidentally, in the case where experiment results as shown in FIG. 3 are acquired, the reference amount of decline can be set at, for example, "0 V". In this case, the value that is smaller than the reference amount of decline is less than "0 V" (e.g., "−0.1 V", or the like).

In the second determination, it is determined whether or not, after the fuel cut is started, the degree of change in the output value of the downstream-side oxygen sensor 127 in a predetermined range (a range from the first reference value to the second reference value) in which the output value of the downstream-side oxygen sensor 127 changes from a value that shows a rich state to a value that shows a lean state is more gradual than a set degree of change that is set beforehand. Concretely, it is determined whether or not the aforementioned response time RT is longer than a reference response time that is set beforehand.

Then, in the case where an affirmative determination is made in the first determination and an affirmative determination is also made in the second determination, it is determined that the downstream-side oxygen sensor 127 is abnormal. That is, in the case where the amount of decline $\Delta V$ in the output value of the downstream-side oxygen sensor 127 is smaller than the reference amount of decline and where the response time RT is longer than the reference response time, it is determined that the downstream-side oxygen sensor 127 is abnormal.

Besides, in the case where a negative determination is made in the first determination and an affirmative determination is made in the second determination, it is not determined that the downstream-side oxygen sensor 127 is abnormal, but the determination is suspended, and re-determination is performed after the next time the fuel cut is started. That is, in the case where the amount of decline $\Delta V$ in the output value of the downstream-side oxygen sensor 127 is greater than the reference amount of decline and where the response time RT is longer than the reference response time, it is not determined that the downstream-side oxygen sensor 127 is abnormal, but the determination is suspended and re-determination is performed after the next time the fuel cut is started.

Besides, if a negative determination is made in the second determination, it is determined that the downstream-side oxygen sensor 127 is normal regardless of a result of determination in the first determination. That is, in the case where the response time RT is shorter than the reference response time, it is determined that the downstream-side oxygen sensor 127 is normal regardless of the amount of decline $\Delta V$ in the output value of the downstream-side oxygen sensor 127.

Figure 4A:
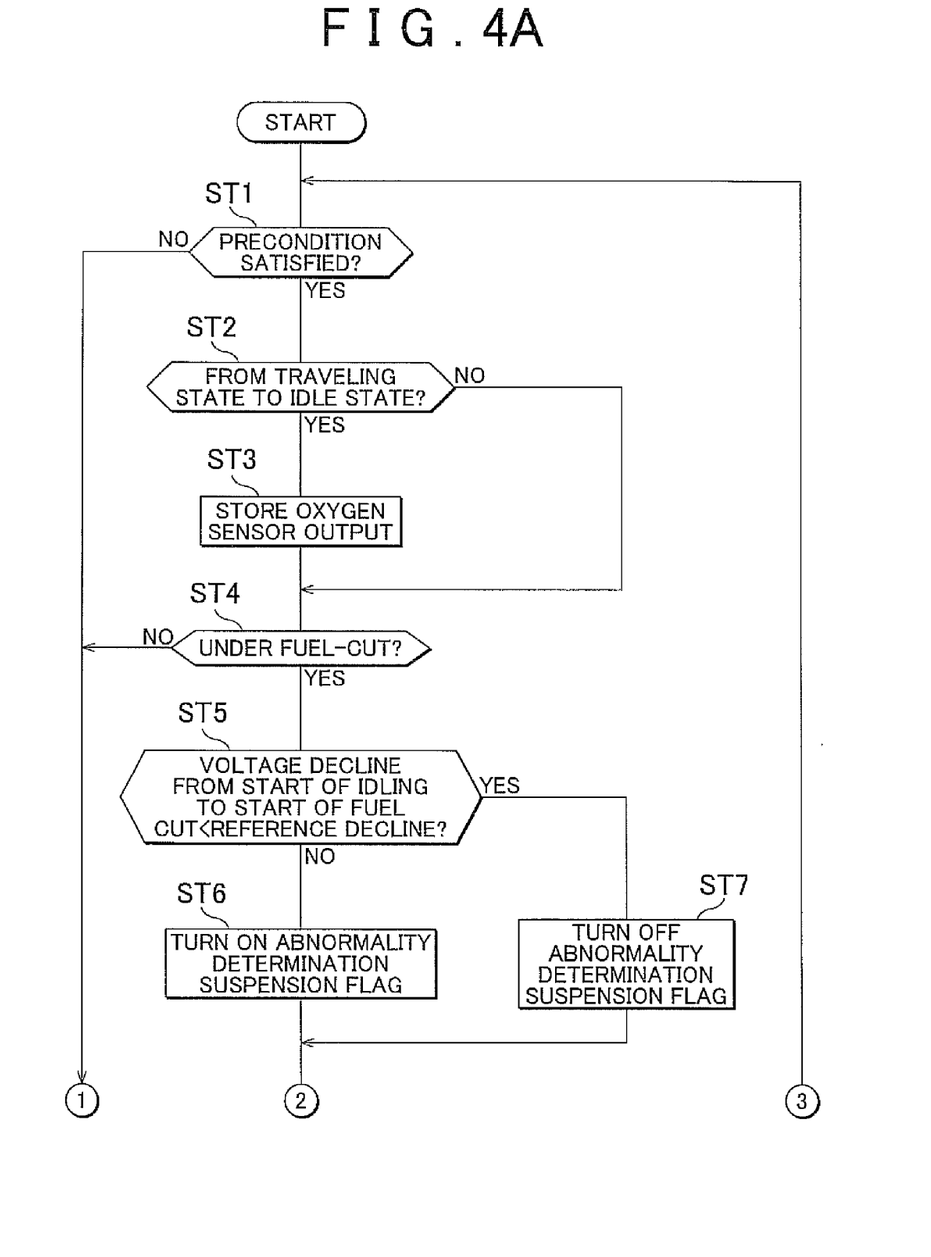
FIGS. 4A and 4B show a flowchart of a process that is executed by an abnormality determination apparatus for an oxygen sensor in accordance with an embodiment of the invention.
Figure 4B:
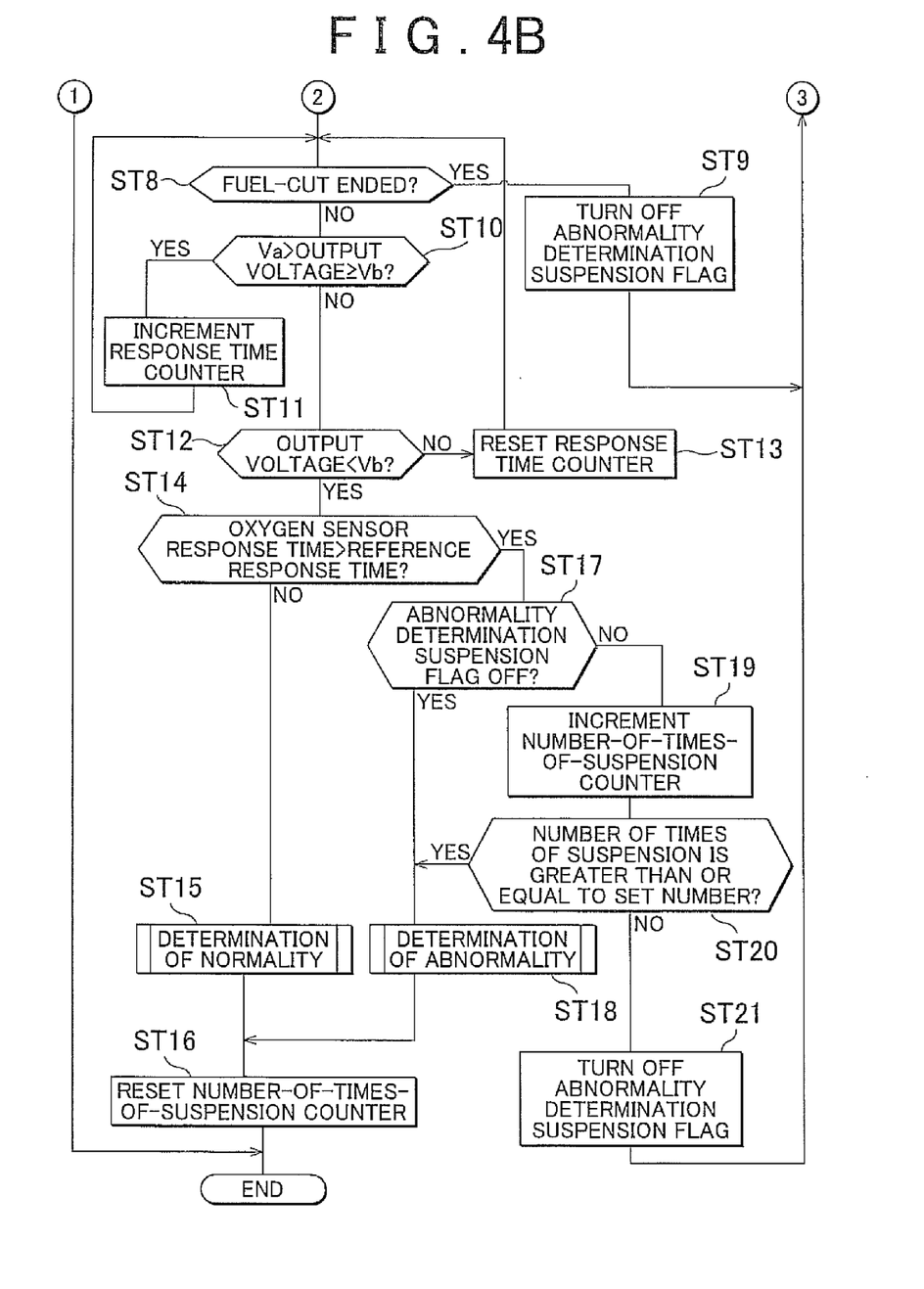

Hereinafter, with reference to the flowchart shown in FIGS. 4A and 4B, a processing procedure of the abnormality determination regarding the downstream-side oxygen sensor 127 that is performed by the abnormality determination apparatus for the oxygen sensor will be described. Incidentally, this processing procedure is repeatedly executed by the ECU 200 at every predetermined period. Besides, the ECU 200 manages a fuel-cut flag that shows the on/off state of the fuel cut, the idle flag, an abnormality determination suspension flag, a rich-output counter, a response time counter, a number-of-times-of-suspension counter, etc.

Incidentally, in the case where the degree of throttle opening determined from the output value of the throttle opening degree sensor 125 is less than or equal to a predetermined degree of opening, the ECU 200 determines that the engine 101 is in the idle state, and turns on the idle flag. In the case where the degree of throttle opening exceeds the predetermined degree of opening, the ECU 200 determines that the engine 101 is in the non-idle state, and turns off the idle flag.

Firstly, in step ST1, it is determined whether or not a precondition to the downstream-side oxygen sensor 127 starting to do the concentration monitoring has been satisfied. As the precondition, it is determined whether or not, for example, the temperature of the downstream-side oxygen sensor 127 and the temperature of the three-way catalyst 108 have reached the prescribed temperatures thereof, respectively. If an affirmative determination is made in this step, the process proceeds to step ST2. On the other hand, if a negative determination is made in this step, a series of processes temporarily ends.

In step ST2, it is determined whether or not the engine 101 has changed from a traveling state into an idle state. Concretely, it is determined whether or not the idle flag is in the on-state. Herein, if an affirmative determination is made in this step, the process proceeds to step ST3. If a negative determination is made in this step, the process proceeds to step ST4.

In step ST3, the output value of the downstream-side oxygen sensor 127 is stored into the memory within the ECU 200. This is a process for acquiring the output value of the downstream-side oxygen sensor 127 when (immediately after) the engine 101 changes from the idle-off state to the idle-on state.

In step ST4, it is determined whether or not the engine 101 is under the fuel cut. This determination is also made on the basis of the state of a fuel-cut flag. If an affirmative determination is made in this step, the process proceeds to step ST5. If a negative determination is made in this step, the series of processes temporarily ends.

In step ST5, the output value of the downstream-side oxygen sensor 127 is acquired, and then the amount of decline ΔV (amount of voltage decline) from the output value of the downstream-side oxygen sensor 127 acquired in step ST3 to the output value thereof acquired in this step is acquired. Then, it is determined whether or not the amount of decline ΔV is smaller than a reference amount of decline that is set beforehand (e.g., "0 V"). For example, if the output value of the downstream-side oxygen sensor 127 acquired in step ST3 is 0.65 V and the output value of the downstream-side oxygen sensor 127 acquired in step ST5 is 0.67 V, the amount of decline (amount of voltage decline) is −0.02 V, which is determined as being smaller than the reference amount of decline if the reference amount of decline is, for example, 0 V. On the other hand, if the output value of the downstream-side oxygen sensor 127 acquired in step ST3 is 0.65 V and the output value of the downstream-side oxygen sensor 127 acquired in step ST5 is 0.60 V, the amount of decline (amount of voltage decline) is 0.05 V, which is determined as being greater than the reference amount of decline if the reference amount of decline is 0 V. If an affirmative determination is made in this step, the process proceeds to step ST7. If a negative determination is made in this step, the process proceeds to step ST6.

In step ST6, the abnormality determination suspension flag is turned on. In step ST7, the abnormality determination suspension flag is turned off.

In step ST8, it is determined whether or not the fuel cut has ended. This determination is also carried out on the basis of the state of the fuel-cut flag. If an affirmative determination is made in this step, the process proceeds to step ST9. On the other hand, if a negative determination is made in this step, the process proceeds to step ST10.

In step ST9, the abnormality determination suspension flag is turned off. Then, the process returns to step ST1.

In step ST10, it is determined whether or not the output value (output voltage) of the downstream-side oxygen sensor 127 is between a first reference value $V_a$ (e.g., 0.35 V) and a second reference value $V_b$ (e.g., 0.2 V) that is lower than the first reference value $V_a$. If an affirmative determination is made in this step, the process proceeds to step ST11. On the other hand, if a negative determination is made in this step, the process proceeds to step ST12.

In step ST11, the response time counter is incremented by 1. Then, the process returns to step ST8.

In step ST12, it is determined whether or not the output value of the downstream-side oxygen sensor 127 is less than the second reference value $V_b$ (e.g., 0.2 V). If an affirmative determination is made in this step, the process proceeds to step ST14. On the other hand, if a negative determination is made in this step, the process proceeds to step ST13.

In step ST13, the response time counter is reset to "0". Then, the process is returned to step ST8.

In step ST14, it is determined whether or not the response time RT of the downstream-side oxygen sensor 127 is longer than a reference response time that is set beforehand. Concretely, it is determined whether or not the counter value of the response time counter is greater than a value that corresponds to the aforementioned reference response time. If an affirmative determination is made in this step, the process proceeds to step ST17. On the other hand, if a negative determination is made in this step, the process proceeds to step ST15.

In step ST15, it is determined that the downstream-side oxygen sensor 127 is normal.

In step ST16, the number-of-times-of-suspension counter is reset to "0".

On the other hand, in step ST17, it is determined whether or not the abnormality determination suspension flag is off. If an affirmative determination is made in this step, the process proceeds to step ST18. On the other hand, if a negative determination is made in this step, the process proceeds to step ST19.

In step ST18, it is determined that the downstream-side oxygen sensor 127 is abnormal. Then, the process proceeds to step ST16. Along with this abnormality determination, it is also possible to perform a process of informing, for example, a driver or the like, that the downstream-side oxygen sensor 127 has abnormality, for example, a process of lighting a predetermined lamp, or the like.

In step ST19, the number-of-times-of-suspension counter is incremented by 1.

In step ST20, it is determined whether or not the number of times of suspension is greater than or equal to a preset number of times (e.g., twice, or the like). Concretely, it is determined whether or not the number-of-times-of-suspension counter value is greater than or equal to a preset value (e.g., 2 or the like). If an affirmative determination is made in this step, the process proceeds to step ST18. That is, it is compulsorily determined that the oxygen sensor 127 is abnormal. On the other hand, if a negative determination is made in this step, the process proceeds to step ST21.

In step ST21, the abnormality determination suspension flag is turned off. Then, the process returns to step ST1.

The processing procedure of the abnormality determination regarding the downstream-side oxygen sensor 127 which has been described above with reference to the flowchart will be further described supplementarily below.

The process of steps ST2 to ST7 is a process for acquiring the amount of decline in the output value of the downstream-side oxygen sensor 127 during the period from when the idle-on state is entered to when the fuel cut is started, and for determining whether or not this amount of decline is smaller than the reference amount of decline (first determination).

The process of steps ST10 to ST13 is a process for determining whether or not the response time RT that is taken for the output value of the downstream-side oxygen sensor 127 to change from the pre-set first reference value to the pre-set second reference value is longer than the pre-set reference response time (second determination).

The process of steps ST14 to ST18 is a process for determining the downstream-side oxygen sensor 127 as being abnormal in the case where an affirmative determination is made in the first determination and where an affirmative determination is also made in the second determination. Besides, the process also includes a process for avoiding determining that the downstream-side oxygen sensor 127 is abnormal in the case where a negative determination is made in the first determination and where an affirmative determination is made in the second determination, and for then performing re-determination (performing the series of processes again) after the next time the fuel cut is started. Besides, the process also includes a process for determining that the downstream-side oxygen sensor 127 is normal regardless of the result of the first determination if a negative determination is made in the second determination.

The process of steps ST17 to ST21 is a process for determining that the downstream-side oxygen sensor 127 is abnormal in the case where a negative determination in the first determination and an affirmative determination in the second determination are made consecutively a number of times that is set beforehand.

Other Embodiments

Although in the foregoing embodiments, the process of steps ST2 to ST5 is performed while the time of the shift from the idle-off state to the idle-on state is regarded as the time when the amount of intake air declines prior to start of the fuel cut, it is also possible that the time when the amount of intake air becomes less than a pre-set threshold value prior to start of the fuel cut may also be regarded as the time when the amount of intake air or the amount of exhaust gas declines prior to start of the fuel cut.

Besides, in the foregoing embodiments, the role served by the intake air amount may instead be served by the amount of exhaust gas (the amount of flow of exhaust gas). In this case, an air flow meter is provided on the exhaust passageway 112, and is connected to the ECU 200. Then, in the procedure of the abnormality determination process described above, the ECU 20 uses the output value of the air flow meter that is provided on the exhaust passageway 112, instead of the intake air amount.

The invention is not limited to the embodiments.

What is claimed is:

1. An oxygen sensor abnormality determination apparatus comprising:

a catalyst provided in an exhaust passageway of an internal combustion engine;

an oxygen sensor provided in the exhaust passageway on a downstream side of the catalyst;

an output decline acquisition portion that acquires an amount of decline in output value of the oxygen sensor during a period from when an amount of intake air declines or when an amount of exhaust gas declines before a fuel cut is started to when the fuel cut is started;

a first determination portion that determines whether or not the amount of decline acquired by the output decline acquisition portion is smaller than a reference amount of decline that is set beforehand;

a second determination portion that determines whether or not, after the fuel cut is started, degree of change in the output value of the oxygen sensor when the output value of the oxygen sensor changes from a first reference value to a second reference value that shows a leaner state than the first reference value is more gradual than a set degree of change that is set beforehand; and a third determination portion that determines whether or not the oxygen sensor is abnormal based on a result of determination by the first determination portion and a result of determination by the second determination portion.

2. The oxygen sensor abnormality determination apparatus according to claim 1, wherein the third determination portion determines that the oxygen sensor is abnormal if it is determined by the first determination portion that the amount of decline is smaller than the reference amount of decline and it is determined by the second determination portion that the degree of change is more gradual than the set degree of change.

3. The oxygen sensor abnormality determination apparatus according to claim 1, wherein when the amount of intake air declines or when the amount of exhaust gas declines before the fuel cut is started is when the internal combustion engine shifts from an idle-off state to an idle-on state.

4. The oxygen sensor abnormality determination apparatus according to claim 1, wherein the second determination portion determines whether or not, after the fuel cut is started, a response time that is taken for the output value of the oxygen sensor to change from the first reference value to the second reference value is longer than a reference response time that is set beforehand.

5. The oxygen sensor abnormality determination apparatus according to claim 1, wherein the third determination portion avoids determining that the oxygen sensor is abnormal, but determines again whether or not the oxygen sensor is abnormal after a next time the fuel cut is started, if it is determined by the first determination portion that the amount of decline is not smaller than the reference amount of decline and it is determined by the second determination portion that the degree of change is more gradual than the set degree of change.

6. The oxygen sensor abnormality determination apparatus according to claim 5, wherein the third determination portion determines that the oxygen sensor is abnormal, if a determination that the amount of decline is not smaller than the reference amount of decline and a determination that the degree of change is more gradual than the set degree of change are made consecutively a pre-set number of times by the first determination portion and the second determination portion, respectively.

7. The oxygen sensor abnormality determination apparatus according to claim 1, wherein
the third determination portion determines that the oxygen sensor is normal if it is determined by the second determination portion that the degree of change is not more gradual than the set degree of change.

8. The oxygen sensor abnormality determination apparatus according to claim 1, wherein
the second determination portion determines whether or not, after the fuel cut is started, degree of change in the output value of the oxygen sensor in a predetermined range in which the output value of the oxygen sensor changes from a value that shows a rich state to a value that shows a lean state is more gradual than the set degree of change.

9. An abnormality determination method for an oxygen sensor provided in a portion of an exhaust passageway of an internal combustion engine which is on a downstream side of a catalyst that is provided in the exhaust passageway, comprising:

acquiring an amount of decline in output value of the oxygen sensor during a period from when an amount of intake air declines or when an amount of exhaust gas declines before a fuel cut is started to when the fuel cut is started;

performing a first determination in which it is determined whether or not the amount of decline is smaller than a reference amount of decline that is set beforehand;

performing a second determination in which it is determined whether or not, after the fuel cut is started, degree of change in the output value of the oxygen sensor when the output value of the oxygen sensor changes from a first reference value to a second reference value that shows a leaner state than the first reference value is more gradual than a set degree of change that is set beforehand; and determining whether or not the oxygen sensor is abnormal based on a result of the first determination and a result of the second determination.

* * * * *